March 7, 1961   J. M. BURTON   2,973,713
IGNITION OF SOLID ROCKET PROPELLANTS
Filed Dec. 31, 1957

INVENTOR.
J. M. BURTON
BY Hudson & Young
ATTORNEYS.

2,973,713
IGNITION OF SOLID ROCKET PROPELLANTS

Joe M. Burton, Springfield, Va., assignor to Phillips Petroleum Company, a corporation of Delaware Filed Dec. 31, 1957, Ser. No. 706,528

3 Claims. (Cl. 102—70)

This invention relates to the ignition of solid rocket propellants. More particularly, it relates to an improved means for igniting solid rocket propellants and the like. It is especially related to an improved ignition means for igniting solid rocket propellants of the composite type loaded or charged in a rocket motor, such as that type of rocket motor employed to assist the take-off of aircraft.

In recent years, considerable work has been directed toward the development of solid rocket propellants suitable for use in rocket motors. Rockets employing solid propellant fuels are extensively used by the military and have also achieved considerable importance in commercial operation. For example, solid rocket propellants are utilized in missiles, projectiles, and rockets to assist planes in take-off or to furnish an extra surge of power in flight.

One type of solid rocket propellant which has been developed successfully for rocket motors, such as the JATO type, is the composite type comprising an inorganic oxidizing salt, such as ammonium nitrate, intimately mixed with a rubbery binder or fuel, such as a copolymer of butadiene and methylvinylpyridine. Many of these propellants are inherently difficult to ignite, especially where ammonium nitrate is employed as the oxidizer. These propellants have relatively high auto-ignition temperatures and are highly susceptible to changes in pressure. These propellants have high specific heats and their heat transfer coefficients are low. Accordingly, extensive development has been carried on in the art to develop suitable igniters for igniting these propellants. Many igniters proposed, developed or patented have been found wanting because they have failed to rapidly ignite the propellant upon firing, that is, they exhibit relatively long ignition lag periods. Many of these igniters have been found wanting because they exhibit excessive brisance or shock upon being fired. Still others have been found wanting because they did not provide reproducible ignition, especially at low temperatures, e.g., —60° F. or —75° F.

An especially useful igniter for solid rocket propellants which has recently been designed is that disclosed and claimed in copending application Serial No. 591,340, filed June 14, 1956, by Barnet R. Adelman. The subject invention can be considered in some aspects to be an improvement over the igniter of said copending application. Although the ignition means of this invention has been found to be especially suitable for igniting solid rocket propellants of the composite type loaded or charged in rocket motors of the JATO type, it is to be understood that the ignition means of this invention is not limited thereto, and the subject invention will be described as applied thereto merely for illustrative purposes.

An object of this invention is to provide novel ignition means for igniting solid rocket propellants or the like. Another object is to improve the ignition of solid rocket propellants, such as the composite type, which are inherently difficult to ignite. Another object is to provide novel ignition means for igniting solid rocket propellants, said means characterized by the ability to rapidly ignite the propellant with a relatively short or minimum period of ignition lag. Another object is to provide novel ignition means for solid rocket propellants, said means having relatively low brisance characteristics. A further object is to provide novel ignition means for igniting solid rocket propellants, said means capable of reproducible ignition. Other objects, advantages and features of this invention will become apparent, to those skilled in the art, from the following discussion, appended claims, and accompanying drawing in which:

Figure 1:
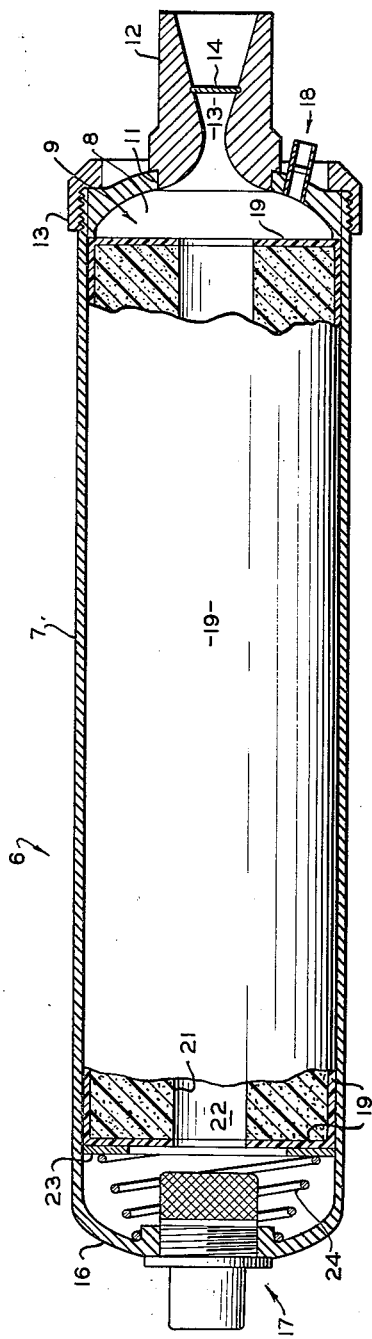
Figure 1 is a longitudinal view in partial section of a rocket motor, such as the JATO type, provided with the novel ignition means of this invention.

Referring now to the drawing, in which like reference numerals have been used to designate like parts, and initially to Figure 1, there is illustrated a rocket motor generally designated 6 of the JATO type. Rocket motor 6 comprises a tubular or cylindrical metal casing 7 which defines a cylindrical combustion chamber 8 in which is loaded a tubular grain of solid propellant generally designated 9. The aft end of rocket motor 6 is provided with an axial opening 11 in which is positioned a reaction nozzle 12, the latter being secured to casing 7 by a suitable annular closure member 13 or the like. Reaction nozzle 12 is provided with an axial converging-diverging passage 13 which communicates at its inlet end with combustion chamber 8. Disposed within passage 13 is a conventional obturating member or starter disc 14 which is adapted to function, for example by rupturing, when a predetermined pressure is built up within combustion chamber 8. The head end 16 of casing 7 is similarly provided with an axial opening in which is threadedly secured an igniter assembly generally designated 17. The aft end of casing 7 can be provided with one or more conventional safety plug attachments generally designated 18 which is adapted to function when an excessive pressure is built up within combustion chamber 8, in a manner well known in the art.

Propellant grain 9 has its outer cylindrical surface and two ends covered with suitable burning restricting material 19, such as rubber or the like. The outer cylindrical surface of the restricting material 19 can be bonded to the inner wall of casing 7 with any suitable adhesive which will effect a reliable metal-rubber bond. Propellant grain 9 is of the internal-burning type by reason of its restricted outer surface and its exposed inner surface 21 which defines axial perforation 22, the exposed surface serving as the initial burning surface of the grain. The relative movement of grain 9 within the combustion chamber 8 can be prevented by any suitable means, such as an annular metal ring 23 positioned adjacent the head end of grain 9, and a suitable resilient spring 24 abutting ring 23 and head closure member 16. Igniter assembly 17 protrudes within the combustion chamber and is preferably positioned in axial alignment with perforation 22.

Although rocket motor 6 is illustrated loaded with a single grain of the internal-burning type, this invention is not limited thereto and the rocket motor can be loaded with grains of the end-burning type, external-burning type, internal-external burning type, etc., or the rocket motor can be loaded with a plurality of spatially aligned grains of any of these types. The rocket motor can be provided with a plurality of igniter assemblies, having varying sizes.

Although the igniter assembly of this invention can be employed to ignite any solid propellant, it is especially useful in igniting grains fabricated from composite type propellant compositions comprising a minor amount of a binder intimately mixed with a major amount of a solid inorganic oxidizing salt. Propellant compositions which are particularly preferred in this invention are those disclosed and claimed in the copending application Serial No. 284,447, filed April 25, 1952, by W. B. Reynolds et al.; a representative propellant composition disclosed in said copending application comprises 10-25 parts by weight of a copolymer of butadiene methylvinylpyridine binder and 75-90 parts by weight of ammonuim nitrate.

Figure 2:
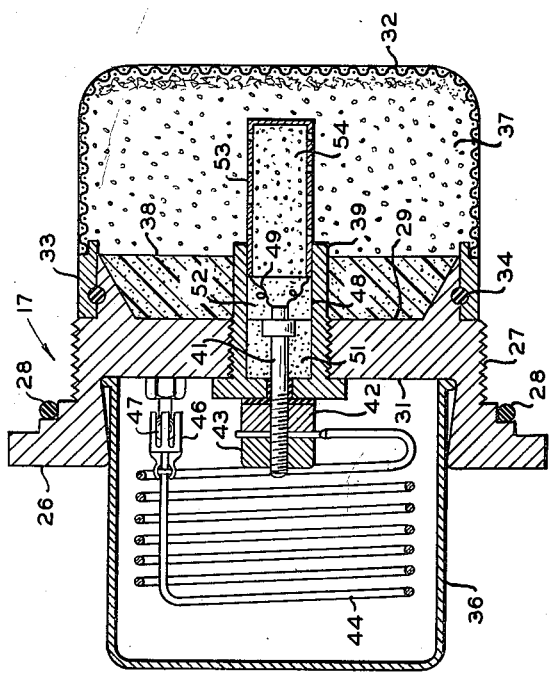
Figure 2 is an enlarged partial view in detail and section of the igniter assembly illustrated in Figure 1.

Reference is now made to Figure 2, in which the igniter assembly 17 of Figure 1 is shown in detail. Igniter assembly 17 comprises an igniter plug 26, a peripheral portion of which is provided with external threads 27 adapted to threadedly engage the threaded opening in the head closure member 16 of Figure 1. Plug 26 can be provided with a suitable O-ring 28 which is adapted to provide a gas-tight seal when the igniter assembly is secured to the head end of the rocket motor. The inner and outer faces 29 and 31, respectively, of igniter plug 26 are countersunk so as to form recessed portions or cavities on both sides thereof. A perforated container 32, such as a wire basket, is attached to an annular member 33 by welding, brazing, etc., the same to the annular member 33. The latter is in turn secured by suitable means to igniter plug 26, preferably with a suitable wire 34. The perforations in container 32 are previously closed or covered with any suitable rubbery or plastic compound which will open or rupture upon being subjected to heat and/or pressure; a suitable coating material for this purpose is a cellulose acetate plastic molding compound. A removable cover or cap 36 fits into the outer recessed portion of igniter plug 26.

Perforated container 32 is loaded with particulate ignition material 37. Ignition material 37 is preferably in granular or pelleted form and can be any suitable material which will generate hot ignition decomposition products upon being ignited and burned, e.g., black powder. An especially useful ignition material is that disclosed and claimed in copending U.S. application Serial No. 592,995, filed June 21, 1956, by L. G. Herring. As disclosed in the Herring application, the ignition material is formed of a plurality of discrete particles comprising powdered material, powdered oxidizing material, and a bonding agent, ethylcellulose. An ignition composition particularly suitable for this purpose, and disclosed in said Herring application, has the following formulation:

TABLE I

| Ingredient: | Weight percent |
|---|---|
| Potassium perchlorate | 26.5 |
| Barium nitrate | 16.6 |
| Zirconium/nickel alloy | 53.9 |
| Ethylcellulose [1] | 3.0 |

[1] Acetone used as solvent in preparation.

Disposed within the inner recessed portion or cavity of igniter plug 26 is suitable ignition sustaining material 38. The latter is in general a propellant composition which is relatively easy to ignite and capable for furnishing hot decomposition products which supplement those products formed by the burning of ignition material 37. Ignition-sustaining material found to be especially useful is that disclosed and claimed in said copending application Serial No. 591,340, to B. R. Adelman. As disclosed in this latter-mentioned application, the ignition-sustaining material comprises a mixture of between 60 and 75 weight percent of an oxidizer such as ammonium perchlorate or potassium perchlorate, between 10 and 40 weight percent of a rubbery binder or fuel such as a polysulfide liquid polymer, and between 5 and 25 weight percent of a finely divided metal such as aluminum, magnesium or titanium. Specific ignition sustaining compositions useful in the practice of this invention and disclosed in the latter-mentioned copending application include the following:

TABLE II

| | Parts by Weight | | | | | |
|---|---|---|---|---|---|---|
| | A | B | C | D | E | F |
| LP-3 [1] | 21.6 | 31.2 | 24.8 | 16.4 | 20.8 | 36.5 |
| Diphenyl guanidine | 0.6 | 0.9 | 0.7 | 0.5 | 0.6 | 1.1 |
| p-Quinone dioxide | 1.5 | 2.2 | 1.7 | 1.1 | 1.3 | 2.6 |
| Di-(butoxyethoxyethoxy)-methane | 1.1 | 1.6 | 1.2 | 0.8 | 1.0 | 1.8 |
| Sulfur | 0.1 | 0.2 | 0.1 | 0.1 | 0.1 | 0.4 |
| Carbon black | 2.2 | 3.1 | 2.5 | 1.6 | 0.5 | 3.6 |
| MgO | 0.2 | 0.3 | 0.2 | 0.2 | 0.2 | 0.4 |
| Fe₂O₃ | 0.3 | 0.5 | 0.4 | 0.2 | 0.5 | |
| Aluminum | 7.1 | 5.9 | 16.4 | 10.7 | 6.0 | 3.6 |
| NH₄ClO₄ | | 19.7 | 52.0 | | | |
| KClO₄ | 65.3 | 34.4 | | 68.4 | 69.0 | 50.0 |

[1] A polysulfide liquid polymer produced by Thiokol Chemical Corporation, Trenton, New Jersey.

Alternatively, two or more of the above-mentioned ignition sustaining compositions can be employed in the form of contiguous discs having variable burning rates.

Referring again to Figure 2, igniter plug 26 is provided with an axial threaded opening through which passes a tubular casing member 39, the outer end of which is enlarged and abuts the outer face 31 of igniter plug 26. An electrical conductor or contact pin 41 passes through suitable insulation in an axial opening in the enlarged portion of casing member 39. The outer or protruding end of contact pin 41 is preferably threaded and connected to a suitable nut 42 which holds the contact pin in place. A second nut 43 is threaded onto the protruding end of contact pin 41. An electrical lead 44 is coiled within removable cap 36, one end of electrical lead 44 being connected to contact pin 41 between nuts 42, 43. The other end of electrical lead 44 is attached to a plug 46 which is adapted to removably fit onto a ball stud 47 or the like which is secured to the outer face 31 of plug 26. Plug 46 is adapted to be disconnected from ball stud 47 and attached to a suitable source of electrical current external the rocket motor after removable cap 36 is removed from igniter plug 26, thereby placing the igniter assembly in an armed condition ready for firing upon the closing of a suitable switch in the source of the electrical current. Any other electrical lead means can be connected to contact pin 41.

The inner end of contact pin 41 extends into a chamber 48 defined by casing member 39. This inner end of contact pin 41 is preferably provided with an intermediate enlarged portion, with the inner extremity of the contact pin connected to suitable bridge wires 49 made of a high resistance material, such as Nichrome alloy or the like, which is adapted to heat up when electrical current is passed thereto. Bridge wires 49 can be grounded by contact with casing member 39 which is made of conductive material. The outer end of the chamber 48 can be filled with suitable insulating material 51 such as porcelain or the like, adapted to retain the axial alignment of contact pin 41. The intermediate portion of chamber 48 is filled with suitable readily ignitable material 52, such as black powder or the like, which material functions as a primer and is adapted to ignite and burn when the bridge wires 49 become hot. Protruding from the inner extremity of chamber 48 is a perforated sleeve 53 which extends into the perforated container 32 and is surrounded by the particulate ignition material 37. Perforated sleeve 53 is provided with suitable perforations or openings in that portion thereof which extends into the perforated container 32. Perforated sleeve 53 is filled with suitable readily ignitable material 54, such as black powder or the like, which material functions as an initiator.

Elements 39, 41, 49, 51, 52, 53 and 54 comprise an igniter initiator.

Figure 3:
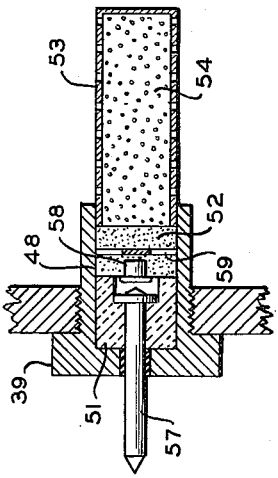
Figure 3 is an enlarged partial view similar to that of Figure 2 illustrating a modification thereof.

Referring to the modification shown in Figure 3, contact pin 57 is longitudinally and difficultly movable within casing member 39, lateral movement of the pin being prevented by porcelain 51. The inner end of contact pin 57 is preferably pointed and normally spaced from an axially aligned percussion cap 58, the latter supported within chamber 48 by a suitable spider 59 or the like. In other respects, the modification of Figure 3 is similar to that of Figure 2, except that the ignition means of Figure 3 is activated by the application of a force of sufficient strength to the outer protruding end of contact pin 57, such as the force applied by a spring actuated hammer or trigger.

In the operation of the rocket motor shown in the drawing, the motor is armed by removing cap 36 from the igniter assembly 17, and plug 46 is removed from ball stud 47, and connected to an electrical circuit, now shown, which includes a source of electricity. Upon closing of a suitable switch, electrical current flows through electrical lead 44, contact pin 41 and bridge wires 49, the latter becoming hot and igniting the readily ignitable material or primer 52. The ignition of igniter material 52 causes the immediate ignition and burning of ignition material or initiator composition 54. Upon combustiion of the latter, hot products of decomposition are generated and passed through the perforations in perforated sleeve 53. Thereafter, the ignition material 37 ignites and burns with the consequent generation of the main ignition decomposition products which melt or otherwise rupture the coating on perforated container 32. The resulting igniter decomposition products from the main ignition charge 37 flow into the combustion chamber 8 of the rocket motor 6, preferentially down through the axial perforation 22 of propellant grain 9, transferring heat to the exposed burning surface 21 and raising the same to an ignition temperature. Subsequently, the propellant material of grain 9 begins to burn and generate gaseous products of combustion, raising the pressure within chamber 8. When a predetermined bursting pressure is reached, starter disc 14 functions to provide a means of escape for the combustion gases from the combustion chamber 8 through the passage 13 of reaction nozzle 12, thereby imparting thrust to the rocket motor. During the ignition period the ignition-sustaining material 38 begins to burn as a result of the burning of the main igniter charge 37, furnishing supplemental ignition decomposition products so as to insure rapid and complete ignition of the propellant grain 9.

The operation of a rocket motor provided with an igniter assembly incorporating the modification illustrated in Figure 3 is essentially the same as that described above, except for the following differences. After the removable cap 36 is removed, thereby arming the rocket motor, a suitable force is applied to the contact pin 57 causing it to move further within the chamber 48 and strike the percussion cap 58. As a result, the readily ignitable material 52 is ignited and this immediately ignites the ignition material 54 within the perforated sleeve 53. Thereafter, the operaton is essentially the same as that described hereinbefore.

*Examples*

The igniter assembly illustrated in Figure 2 was evaluated by actually firing four of such devices in a cylindrical test chamber having a length of 30 inches and a diameter measuring 5¼ inches. The overall length of the casing 39 and inserted perforated sleeve 53 was 2.0 inches, the latter had twelve perforations ⅛ inch in diameter on about ¼ inch centers in four equally spaced rows of three holes each, the perforated sleeve measuring 1⅜ inch in length with an outside diameter of ⅜ inch. Black powder was used as the primer and initiator charges, the total amount being 2 grams. The main pyrotechnic charge 37 (114 grams) had a composition like that of Table I while the sustainer composition 38 (55 grams) was like composition E of Table II. The four igniter assemblies were each fired at 60° F. and for comparison purposes igniter assemblies of said copending application Serial No. 591,340 were fired at the same temperature employing the same types and amounts of the pyrotechnic charge and sustainer composition. The results of these tests are set forth in Table III.

TABLE III

| | Igniter assembly of this application (figure 2) | Igniter assembly of application S.N. 591,340 |
|---|---|---|
| Ignition delay (milliseconds) | 9 | 43.2 |
| Standard deviation | 3 | 8.3 |
| Rate pressure rise (p.s.i./milliseconds) | 5.48 | 6.96 |
| Standard deviation | 0.80 | 0.92 |

The above data of Table III clearly indicate the improvement and advantages of this invention, these data showing the igniter assembly of this invention exhibits a relatively short period of ignition lag, thereby insuring rapid ignition of the propellant charge in a rocket motor. The small standard deviation of ignition delay further indicates that the rapid ignition is reproducible, an important feature especially where a large number of JATO units are used to assist the take-off of aircraft where it is essential that all units ignite at the same time so as to provide uniform thrust. The low rate of pressure rise exhibited by the igniter assemblies of this invention indicate a desirably low order of brisance, a feature which insures the safe and uniform ignition of a propellant charge in a rocket motor.

The igniter assembly of this invention was similarly evaluated at −75° F. by firing 10 such devices, which firings resulted in an average ignition delay of about 10 milliseconds, whereas the igniter assembly of said copending application Serial No. 591,340 when fired at −75° F. had an ignition delay of about 40 milliseconds. These tests are further evidence of the advantages of this invention, especially at low temperatures where it is often difficult to satisfactorily ignite solid propellants.

Various modifications and alterations of this invention will become apparent to those skilled in the art without departing from the scope and spirit thereof, and it is to be understood that the foregoing discussion and drawing merely illustrate preferred embodiments of this invention and do not unduly limit the same.

I claim:

1. In an igniter assembly for a rocket motor comprising, in combination, an igniter plug having an inner and outer face; ignition sustainer material positioned against the inner face of said plug; a perforated container attached to the inner end of said plug; and igniter material disposed within said container and in contact with said ignition sustainer material; an igniter initiator comprising a tubular casing axially passing through said plug and connected thereto, a contact pin axially positioned within said casing and extending therefrom away from said outer face, insulation material filling one end of said casing and surrounding a portion of said contact pin, a primer composition filling a portion of said casing in proximity to the inner end of said contact pin, a perforated sleeve connected to said casing and extending therefrom into said igniter material, the outer end of said sleeve being closed, and an initiator composition filling said sleeve and in contact with said primer whereby ignition of the latter results in ignition of the former.

2. In an igniter assembly for a rocket motor comprising, in combination, an igniter plug having a countersunk inner face, thereby forming a cavity in the inner end of said plug; ignition sustainer material disposed within said cavity; a perforated container attached to the inner end of said plug; and igniter material disposed within said container and in contact with said ignition sustainer material; an electrically actuated igniter initiator comprising a tubular casing axially passing through said igniter plug and connected thereto, said casing having a first opening at one end and a relatively larger second opening at the other end, an electrical contact pin axially positioned within said casing and passing through and extending from said first opening, insulation material filling one end of said casing adjacent said first opening and surrounding a portion of said contact pin, bridge wires connected to the inner end of said contact pin and grounded to said casing, a primer composition filling a portion of said casing and embedding said bridge wires, a perforated sleeve connected to said casing and extending out from said second opening into said igniter material, the outer end of said sleeve being closed, and an initiator composition filling said sleeve and in contact with said primer whereby ignition of the latter results in ignition of the former.

3. In an igniter assembly for a rocket motor comprising, in combination, an igniter plug having a countersunk inner face, thereby forming a cavity in the inner end of said plug; ignition sustainer material disposed within said cavity; a perforated container attached to the inner end of said plug; and igniter material disposed within said container and in contact with said ignition sustainer material; a force actuated igniter initiator comprising a tubular casing axially passing through said igniter plug and connected thereto, said casing having a first opening at one end and a relatively larger second opening at the other end, a movable contact pin axially positioned within said casing and passing through and extending from said first opening, insulation material filling one end of said casing adjacent said first opening and surrounding a portion of said contact pin, the latter having a sharp inner end, a percussion cap in said casing adjacent and slightly spaced from said inner end of said contact pin, a primer composition filling a portion of said casing and in proximity to said percussion cap, a perforated sleeve connected to said casing and extending out from said second opening into said igniter material, the outer end of said sleeve being closed, and an initiator composition filling said sleeve and in contact with said primer whereby ignition of the latter results in ignition of the former.

References Cited in the file of this patent

UNITED STATES PATENTS

| | | |
|---|---|---|
| 712,826 | Mason | Nov. 4, 1902 |
| 753,035 | Bennett | Feb. 23, 1904 |
| 2,508,444 | Catlin | May 23, 1950 |
| 2,516,898 | Meister | Aug. 1, 1950 |
| 2,561,670 | Miller | July 24, 1951 |
| 2,592,623 | Turnbull | Apr. 15, 1952 |
| 2,632,299 | Loughran | Mar. 24, 1953 |
| 2,696,191 | Sheehan | Dec. 7, 1954 |
| 2,791,962 | Terce | May 14, 1957 |
| 2,828,691 | Webster | Apr. 1, 1958 |

FOREIGN PATENTS

| | | |
|---|---|---|
| 1,121,170 | France | Apr. 30, 1956 |